(12) United States Patent
Arsenio

(10) Patent No.: US 9,137,279 B2
(45) Date of Patent: Sep. 15, 2015

(54) METHOD FOR TRANSPORTING MULTIMEDIA INFORMATION AND DEVICE FOR PROCESSING MULTIMEDIA INFORMATION

(75) Inventor: Artur Arsenio, Queijas (PT)

(73) Assignee: Nokia Siemens Networks OY, Espoo (FI)

( * ) Notice: Subject to any disclaimer, the term of this patent is extended or adjusted under 35 U.S.C. 154(b) by 287 days.

(21) Appl. No.: 13/404,181

(22) Filed: Feb. 24, 2012

(65) Prior Publication Data

US 2012/0221740 A1  Aug. 30, 2012

(30) Foreign Application Priority Data

Feb. 24, 2011  (EP) ..................................... 11155848

(51) Int. Cl.
*H04L 29/06* (2006.01)
*H04L 12/46* (2006.01)
*H04N 21/2387* (2011.01)
*H04N 21/482* (2011.01)

(52) U.S. Cl.
CPC ........ *H04L 65/4076* (2013.01); *H04L 65/4084* (2013.01); *H04L 65/4092* (2013.01); *H04L 65/608* (2013.01); *H04L 65/80* (2013.01); *H04N 21/2387* (2013.01); *H04N 21/482* (2013.01)

(58) Field of Classification Search
USPC ........................................................ 709/231
See application file for complete search history.

(56) References Cited

U.S. PATENT DOCUMENTS

| | | | |
|---|---|---|---|
| 2002/0196746 A1 | 12/2002 | Allen | |
| 2003/0174837 A1* | 9/2003 | Candelore et al. | 380/210 |
| 2006/0174277 A1* | 8/2006 | Sezan et al. | 725/46 |
| 2006/0293954 A1* | 12/2006 | Anderson et al. | 705/14 |
| 2009/0165057 A1* | 6/2009 | Miller et al. | 725/68 |
| 2012/0197992 A1* | 8/2012 | Meyer et al. | 709/204 |
| 2013/0147602 A1* | 6/2013 | Toebes et al. | 340/5.82 |

FOREIGN PATENT DOCUMENTS

WO  2008/136610 A2  11/2008

\* cited by examiner

*Primary Examiner* — Angela Nguyen
(74) *Attorney, Agent, or Firm* — Laurence A. Greenberg; Werner H. Stemer; Ralph E. Locher

(57) ABSTRACT

A method for transporting multimedia information, wherein the multimedia information has several data streams. At least two of the data streams represent at least partially alternative contents of the multimedia information. The multimedia information includes at least one forking point for selecting one of at least two of the data streams. One of the data streams is selected based on a trigger provided by at least one decentralized component. An item of control information is provided for the data stream thus selected. A corresponding device is configured for processing the multimedia information accordingly.

22 Claims, 10 Drawing Sheets

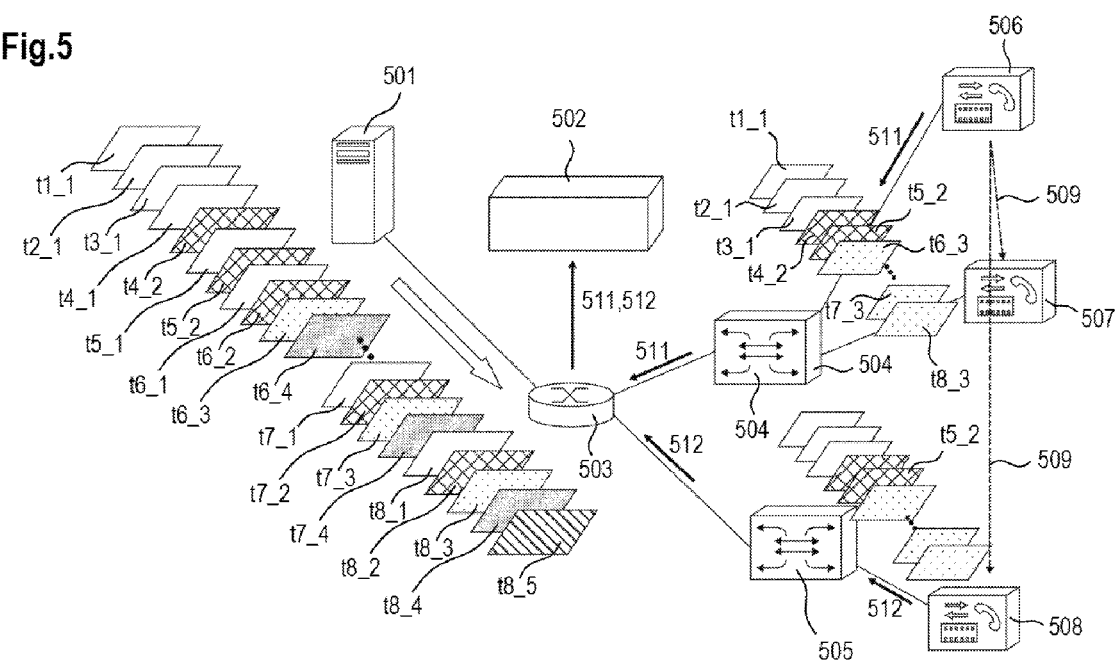

METHOD FOR TRANSPORTING MULTIMEDIA INFORMATION AND DEVICE FOR PROCESSING MULTIMEDIA INFORMATION

CROSS-REFERENCE TO RELATED APPLICATION

This application claims the priority, under 35 U.S.C. §119, of European patent application EP11155848, filed Feb. 24, 2011; the prior application is herewith incorporated by reference in its entirety.

BACKGROUND OF THE INVENTION

Field of the Invention

The invention relates to a method for transporting multimedia information and to a device for processing multimedia information.

Telecommunication operators deliver to their clients or subscribers various services in particular content of high video and/or audio quality. Also, the users' demands for interactivity increases: The users want to have an impact on the content and/or interact with the content provided.

However, nowadays interaction with video content provided is limited. It is known to select a movie or program on demand, but the interaction of the user during the content being provided is limited.

SUMMARY OF THE INVENTION

It is accordingly an object of the invention to provide a method for transporting multimedia information and device for processing multimedia information which overcome the above-mentioned disadvantages of the heretofore-known devices and methods of this general type and which, in particular, enables a flexible approach for user interaction with a content provided, say, from an operator via broadcast, multicast and/or unicast.

With the foregoing and other objects in view there is provided, in accordance with the invention, a method for transporting multimedia information, the method which comprises:

providing the multimedia information formed of a plurality of data streams, with at least two of the data streams at least partially representing alternative contents of the multimedia information;

the multimedia information including at least one forking point for selecting one of at least two of the data streams;

selecting one of the data streams based on a trigger provided by at least one decentralized component; and providing control information for the selected data stream.

In other words, the objects are achieved, in accordance with the invention, by way of a method for transporting multimedia information:

wherein the multimedia information comprises several data streams, wherein at least two of the data streams at least partially represent alternative contents of the multimedia information;

wherein the multimedia information comprises at least one forking point for selecting one of at least two of the data streams;

wherein one of the data streams is selected based on a trigger provided by at least one decentralized component;

wherein a control information is provided for the data stream selected.

The decentralized component may be a (personal) computer, a mobile device or a set-top-box deployed at the users location, in particular the user's premises.

The multimedia information may comprise any audio and/or video information, in particular video and/or audio streams, e.g., a movie, an audio play, etc.

The data stream can be regarded as a portion of the multimedia information. In this regard, the data stream itself may lead to and/or comprise a forking point. The data stream can be any information (e.g., file, etc.) that comprises such portion of the multimedia information. The data stream may comprise a time segment of the multimedia information, wherein several such time segments may provide a version of the multimedia information. For example, several versions of a movie can be associated with the multimedia information, wherein based on selections (also referred to as choices) made at the forking points, a path along a particular combination of data streams is determined. Hence, the content of the movie can be altered based on user interaction. The multimedia information may have one ending (combining different versions of data streams to a single ending) or it may have various endings that could be reached via different paths, i.e. via different data streams upon user selection.

The choice can be made at the decentralized component and a trigger according to the choice is generated and conveyed from the decentralized component to, e.g., a centralized component via a communication network, comprising, e.g., the Internet.

The multimedia information comprises at least one forking point: The forking point allows selecting different data streams to continue. For example, a movie may reach a point at which the user can decide how to continue. This is achieved by providing said trigger (preferably within a given time). The multimedia information then continues according to the choice made by the user, i.e. the trigger provided by the decentralized component.

It is noted that the data stream can be transmitted via a channel, in particular via a multicast channel. The channel can be created for the data stream selected. The channel can be released if no decentralized component is processing the corresponding data stream (any more). It is an option that channels are created for all data streams available (or a portion thereof). In particular, the channel can be created based on the trigger received. The control information can be used to access the channel, in particular the channel that is associated with the data stream selected. This mechanism may for example utilize an Internet Group Management Protocol (IGMP).

It is also noted that in case a (multicast) channel is not being watched, the transmission could be ceased and the resource for this channel can be released. Once the multimedia information, e.g., video or movie, reaches its end, all (dynamic multicast) channels associated with this multimedia information can be released and the resources allocated can be reused (e.g., by clearing an associated table comprising the dynamic channels and the decisions at the decentralized components, e.g., set-top-boxes).

It is further noted that the creation of the (multicast) channels can be done incrementally, e.g., controlled by a centralized component: For example, a DSLAM and/or an IGMP multicast router may associate the triggers with dynamic multicast channel numbers; as an alternative, the decentralized component may first send a trigger to a middleware, which replies with a dynamic multicast channel number and creates such channel, then the decentralized component may join this channel.

The middleware may trigger a video server to convey a particular data stream and inform a router to forward the data stream to decentralized components. The communication with the middleware can be done via a control plane. The decentralized components, the video server and the router may exchange information via this control plane. A data plane is used for conveying the actual data streams (payload data).

The benefit of such a solution is to reduce the number of unicast transmissions, which require extensive resources, which may limit the possible interactions provided by the operators via their network capabilities. This can be achieved by the synchronization suggested herein and/or by allowing some delay. The approach suggested is in particular applicable for various scenarios, e.g., interactive movies, social networks, 3D television, etc.

The solution presented is also highly flexible and even allows unicast transmission(s), e.g., for data streams that are watched by only a few users, wherein most of the channels watched can be conveyed via multicast channels.

The solution presented advantageously allows interactively combining data streams, e.g., scenes and/or frames of a multimedia information or content of any kind. Hence, different (but related) versions of a content (video, movie, audio play, etc.) can be selected, preferably along the content being transmitted (received at the decentralized component, e.g., the user's device).

The solution can be integrated and/or used with existing hardware. It may in particular use or be based on known communication protocols, e.g., RTP, RTSP, SDP, SAP, IGMP and/or PIM.

The approach may in particular provide the possibility for a user to change the story of a multimedia information by selecting data streams (versions of the content) at forking points. The user may experience this independently or he may share it as a common experience with a group of users. It is also possible to experience a networked game with several users sending triggers via their decentralized components at forking points of the multimedia information.

In an embodiment, one of the data streams is selected based on several triggers provided by several decentralized components in particular
 for a group of decentralized components or
 for independent viewers.

For example, several users may (independently or together) watch a movie conveyed via said multimedia information. These users may provide separate choices (via said triggers) at the forking point according to their individual preferences.

In case several users watch the movie together as, e.g., a group event, a combined decision can be determined, e.g., by a voting or a weighting mechanism or a combination thereof. Also, a single user may decide which choice to make and this choice then defines the data stream that will be conveyed to all users of the group. As an alternative, one user may arbitrate a voting mechanism, e.g., the other (or all) users may cast a vote which choice they prefer and the result of the voting can be presented in a pop-up window to all users (or only to the deciding user). The user in charge of the decision may then decide based on the votes either manually (e.g. in case of a draw) or the decision can be made automatically (based on the majority of votes).

If the users watch the movie independently from each other, each user can make a choice thereby conveying the trigger and selecting the data stream. This can be achieved by combining identical choices, i.e. transmitting a multicast data stream according to a first choice to all decentralized components that sent the trigger "first choice" and transmitting a multicast data stream according to a second choice to all decentralized components that sent the trigger "second choice", etc. This can also be done in a transparent manner, i.e. without bothering the respective users, because the control information for the multicast data streams can be sent to the decentralized components and the decentralized components select the data stream according to this control information. The users still watch the same movie "ABC" without having to worry about the actual physical channel that conveys the respective data stream to their decentralized components (different physical channels are thus efficiently being used for different data streams).

It is noted that a resource can be released in case a data stream is no longer required by any decentralized component (it may be switched off or the user may have switched to a different movie or program).

In another embodiment, one of the data streams is selected based on properties and/or parameters of decentralized components.

A decision can be made, e.g., by the centralized component (e.g., a middleware functionality) based on properties and/or parameters (e.g., quality of service, data rate, delay, etc.) according to which decentralized components are combined to a group to which a particular data stream is conveyed. Hence, the centralized component can detect which decentralized components can be gathered together into a group based on such properties and/or parameters and thus send the data stream to these decentralized components, e.g., via a multicast channel (e.g., considering the properties and/or parameters).

In addition to the trigger that selects the data stream, these additional properties and/or parameters can be used to ensure an efficient utilization of resources. For example, decentralized components that experience large delays may be combined to a first group supplied with a data stream via a first (multicast) channel and decentralized components that experience no or minor delays may be combined to a second group supplied with the same content, but the data stream for this second group is conveyed via a second (multicast) channel, which allows, e.g., transmission of a higher quality or resolution. The selection or grouping can be conducted by the middleware or by any centralized component that is connected via the network to the decentralized components. In this example, a decentralized component with a large delay may join the first group. This can be decided by the centralized component, e.g., the middleware.

Accordingly, unicast and/or multicast channels can be created based on such properties and/or parameters.

In a further embodiment, the decentralized component informs at least one other decentralized component about the data stream selected.

This can be achieved by conveying said control information to the at least one other decentralized component. Hence, a user can inform a friend of a social network about the version of the multimedia information he is watching. The friend may join this version and even participate in making choices (sending triggers via his decentralized component) at upcoming forking points. The user may therefore send an invite comprising, e.g., an allowance, a channel identification and/or a multicast address or group reference to his friend(s). The friend can, e.g., via a mobile device or his set-top-box, use or accept this invite and join the data stream.

In a next embodiment, one of the data streams is selected based on at least one trigger arriving within a predetermined amount of time.

It is an option to define a duration, e.g., prior to the forking point to the actual time of the forking point (and possibly after the forking point) until which the trigger has to arrive. This can be regarded as time window that may have no limit in the past (e.g., the choice can be made at the beginning of a movie or even before considering a global configuration provided by the user), but a limitation at the time around the forking point. For example, arriving at the forking point, the data stream can be paused, until a decision is made or the pause may last for a predetermined period of time. If no trigger is detected, a default choice can be assumed and the according data stream for such a default decision is used.

If several users watch the movie and arrive at a forking point, a decision for a selection of a data stream may have already been made when a trigger from a decentralized components arrives (e.g., the late trigger arrives within a predetermined period of time after the decision has been made): In such case, the trigger can still be considered by providing this decentralized component with the data stream according to the decision made, even if this is a different physical data stream. It is in particular an option to allocate and create a (e.g., multicast or unicast) channel for this decentralized component and convey the data stream according to the late choice of this decentralized component. This data stream may have a different timing as the data stream of the decentralized components that made their choices within time.

Pursuant to another embodiment, one of the data streams is selected by default in case no trigger arrives within the predetermined amount of time.

It is noted that the default selection can be a choice that has already been indicated by at least one trigger. Hence, the default data stream is then a data stream that is already provided for at least one decentralized component. However, it is also an option that the default data stream is selected according to a different mechanism and it is in particular independent from triggers provided by other decentralized components.

It is also an embodiment that the data stream selected is joined by at least one further decentralized component which provides the trigger for this data stream within a predetermined amount of time after the data stream has been selected.

The data stream can thus be conveyed to this further decentralized component. The further decentralized component can "jump" on the data stream that has already been selected. For the duration of the predetermined amount of time (e.g., according to a time window) the trigger can be provided after the selection of the data stream has been concluded and the further decentralized component can still obtain the data stream, e.g., join a multicast channel.

The late trigger can be (e.g., when it arrives within a time window) considered and the decentralized component providing this late trigger may join the data stream that has already been transmitted towards other decentralized components. Losing some frames of this data stream may be acceptable and preferable in view of the alternative of creating a new channel and thus allocating additional resources.

According to an embodiment, the at least two data streams that can be selected at a forking point are identical for a limited duration around or after the forking point.

This efficiently allows a smooth transition between data streams in case a decentralized component provides the trigger after the selection has been made: In such case, the decentralized component may be supplied with the default data stream, but a switching to the data stream selected based on the trigger can still be conducted after some time after the forking point in case the data streams are identical. Hence, a late choice can result in switching to a different data stream after the forking point, because the content of the default data stream and the actual data stream selected are still identical (or show only minor differences).

According to another embodiment, the multimedia information is provided via a network, in particular from at least one centralized network element.

The centralized network element can comprise a video server, a router and/or a middleware functionality. It is noted that the at least one data stream of the multimedia information can be provided by this centralized network element or by any other (centralized or decentralized) network element. The centralized network element(s) may be a component that is associated within the sphere of the operator, wherein the decentralized network element may be a device utilized by the user (at home or when travelling).

The network may at least partially comprise and/or utilize the Internet.

It is noted that there may be a first centralized network element processing the triggers and a second (de-)centralized network element providing the data streams. The first and second network elements can be distributed across the network, e.g., deployed within the sphere of an operator or service provider. It is, however, also a possibility that one network component processes the triggers and provides the data streams.

In yet another embodiment, the multimedia information or at least one data stream of the multimedia information is provided by the decentralized component.

This decentralized component may provide at least one of the data streams via the network to the centralized network element and/or to any other decentralized component. Hence, streaming of multimedia information can also be achieved from a users device to another users device.

According to a next embodiment, the trigger is based on at least one of the following:
 a choice made by a user at the decentralized component, said choice being conveyed by said decentralized component;
 an automatic choice made by the decentralized component based on an environmental condition and/or a parameter in particular determined by a sensor or via an electronic interface or network.

Hence, the parameter may be determined by a sensor attached to the decentralized component or by a sensor that is connected to the decentralized component via a network. The decentralized component may be connected to the Internet and determine a value or status stored in or derived from the Internet and thus automatically make a choice dependent on this value or status.

The choice can be made prior to the forking point. The choice may affect one or several upcoming forking point(s). The choice may in particular be a global choice affecting several data streams or even various kinds of multimedia information. Such global choice can be made, e.g., by configuring the decentralized component, e.g., computer or set-top-box.

Pursuant to yet an embodiment, the environment condition comprises at least one of the following:
 sensor data obtained by the decentralized component;
 an information obtained by the decentralized component via the Internet;
 an information obtained by the decentralized component from interaction with at least one user, in particular a group of users;
 a weather information;
 a time;
 a temperature;
 a brightness.

According to a further embodiment, the control information comprises at least one of the following:
- an address information that allows access to the data stream selected by the trigger;
- a channel information to access the data stream selected by the trigger;
- a time information.

In a further embodiment, the control information is conveyed to at least one decentralized component.

The control information may enable the at least one decentralized component to access the data stream selected. This can be achieved, e.g., by providing multicast address information: The at least one decentralized component can join the data stream by using this multicast address information.

It is noted that for a data stream which is no longer required (e.g., no user watching this version of the movie any more) the resources can automatically be released and allocated otherwise. This allows a flexible utilization of the resources available, e.g., for multicast transmission.

According to a next embodiment, the several data streams or at least a portion thereof is/are recorded in particular via a network recorder or via a client recorder.

It is thus an option that a recording entity records all (or a portion of) versions of data streams based on potential triggers. This may be an advantageous scenario in case the user only watches a specific version of a movie or in case the user is not watching the movie at all. Hence, regardless of the actual triggers conveyed by the decentralized component (or by several such components), all (or a portion thereof) versions of the content (multimedia information) can be stored and thus made available at a later time.

Pursuant to an embodiment, one of the data streams recorded is selected based on a trigger provided by the at least one decentralized component.

Hence, in case the user wants to watch a recorded content, he still has the opportunity to make choices and thus interactively use the recorded content. It is thus an advantage that the recording function can be individualized, e.g., different versions of the movie can be recorded and watched at a later time.

In a further embodiment, a summary information is generated based on the at least one forking point and the at least one trigger provided.

Hence, at the end or at a certain point of a multimedia information (e.g., video, movie, music, radio play, etc.) such summary can be generated and, e.g., visualized via the decentralized component (e.g., set-top-box) to provide an overview regarding choices made by a user or a group of users, e.g., together with further optional choices (not yet made) and/or choices that were made by other users or other groups, e.g., of a social network.

According to another embodiment, at least some of the data streams comprise different perspectives of the multimedia information.

Hence, several data streams can be provided in parallel that provide different perspectives to a scene, e.g., a sports event or a movie. A user can, e.g., switch between the different scenes at the forking points. It is also a solution that different data streams are conveyed in a superimposed manner thereby enabling 3D viewing experiences.

According to a next embodiment, several data streams are conveyed at least partially at the same time to the at least one decentralized component.

This can advantageously be done for a predetermined amount of time after or around a forking point. In particular, all data streams that could be selected can be conveyed to the at least one decentralized device. A delay that is based on the fact that the decentralized component after having sent the trigger has to wait for the data stream selected can be reduced or compensated if all potential data streams are already available at the decentralized component at or prior to reaching the forking point. Then the trigger can be used to select the data stream and the decentralized component experiences no delay or only minor delay before the storyline continues.

The problem stated above is also solved by a device for processing multimedia information, wherein the multimedia information comprises several data streams, wherein at least two of the data streams at least partially represent alternative contents of the multimedia information and wherein the multimedia information comprises at least one forking point for selecting one of at least two of the data streams, comprising or being associated with a processing unit that is arranged
- for selecting one of the data streams based on a trigger provided by at least one decentralized component;
- for providing a control information for the data stream selected.

It is noted that the steps of the method stated herein may be executable on this processing unit as well.

The device may be a centralized network component, e.g., a router, video server, middleware component or combination thereof. The centralized network component may be distributed across a communication network comprising, e.g., the Internet. The centralized network component can be maintained by an operator or service provider that offers said multimedia information to customers via said at least one decentralized component. The centralized component supports independent viewers as well as networked viewers and may provide unicast, multicast and broadcast services.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

The solution provided herein further comprises a computer program product directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

Furthermore, the problem stated above is solved by a communication system comprising at least one device as described herein.

Other features which are considered as characteristic for the invention are set forth in the appended claims.

Although the invention is illustrated and described herein as embodied in a method for transporting multimedia information and device for processing multimedia information, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 5 shows an exemplary network architecture according to a networked viewers scenario comprising a video server and a middleware both connected to a router, wherein two DSLAMs 504 connect the router to user devices;

DETAILED DESCRIPTION OF THE INVENTION

The invention in particular suggests an efficient network mechanism for distributing interactive content (also referred to as multimedia information) from multiple input sources to multiple output destinations such that each destination can get or use a personalized version of the content, in accordance with choices (also referred to as decisions) made by a user. These choices may change the information this particular user obtains.

Interactive content may comprise any audio and/or video data, in particular movies or programs. The content can be streamed (via a data stream) to a user, in particular to a device, e.g., a set-top-box or an application running on a device, e.g., a console or a (personal) computer. The content can accordingly be streamed to many users (i.e. said devices).

Hence, the approach allows content being composed by the user or by multiple users. For example, the user can adopt a role of a character of a video content and he may make decisions for this character, e.g., at predetermined instants of time (or within given time windows). Also, several users may adopt roles of different characters in a movie and make decisions (e.g., at predetermined instants of time or within time windows). Each decision may change the content to be received by the user (or by any user or some other users).

The content can be conveyed in an efficient manner, which is an important issue considering the fact that each choice of each user is a forking point leading to two or more alternatives and thus to an exponential number of content streams across the various forking points.

In order to keep the complexity and thus the costs manageable for the operator, this concept shall not lead to an indefinite amount of traffic (and/or bandwidth) in the operator's communication network.

A control plane could be provided that is used for conveying control data transmitted by the users indicating their choices. The control data can be sent in uplink direction (from the users' devices towards the network) to a middleware (layer or component) that triggers a video head-end (e.g., a video-on-demand server) to stream the video content based on said decision in downlink direction to the users' devices.

Hence, the approach presented enables a system for composing and personalizing video content that is distributed across the network. Preferably, the impact on the bandwidth required is limited as described herein.

Figure 1:
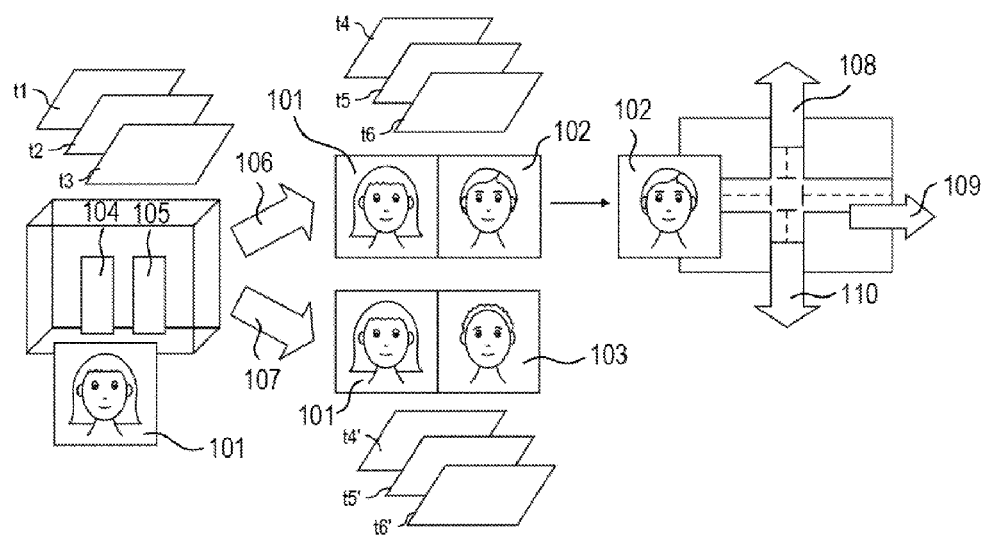
FIG. 1 shows a schematic diagram visualizing an exemplary movie usecase comprising several different versions of a movie, wherein the version of the movie that is transmitted depends on at least one choice of at least one user.

Exemplary Utilizations:

FIG. 1 shows a schematic diagram visualizing an exemplary movie usecase comprising several different versions of a movie, wherein the version of the movie that is transmitted depends on at least one choice of at least one user. Hereinafter, a data stream being conveyed to a user indicates that the data stream is actually conveyed to a set-top-box of the user and the user is able to watch the data stream. An interaction of the user is also achieved via the set-top-box, i.e. the set-top-box transmits an information according to the interaction (e.g., a choice made by the user) to the network. It is noted that the set-top-box may be any device that allows user interaction. It can also be a (personal) computer, a program run on a mobile device or the like. It is further noted that the user interaction can be provided via a communication medium (e.g., via a mobile telephone) that can be different from the medium that is used for conveying the data stream of the movie.

According to FIG. 1, a cartoon movie comprises three different characters 101, 102 and 103. Also, two users 104, 105 are connected to the network watching (and interacting) with the data stream provided as movie. The movie can be watched in an interactive way, hence the user 104 takes the role of the character 101 and the user 105 takes the role of the character 102.

The movie comprises scenes t1 to t3 that are conveyed via the network to both users 104 and 105. After the scene t3, the user 104 has to take a choice (see options 106 and 107) for the character 101. Pursuant to the option 106, the character 101 meets the character 102 and according to option 107, the character 101 meets the character 103. Hence, two different versions of the movie are available after scene t3, indicated by scenes t4 to t6 and t4' to t6'.

After the scene t6, the user 105 for his or her character 102 can decide which option 108, 109 or 110 to choose. Each option will lead to a different content and requires different data to be conveyed to the users (at least to those users sharing the same content). It is noted that the options 106, 107 and 108 to 110 may lead to totally separate content or to at least partially identical content portions: For example, option 106 and option 110 may result in the same content as option 107 at a later time instant.

If other users are watching the movie in broadcast or multicast, they may opt for a non-interactive movie version (i.e., a default choice is made automatically by the system after the scene t3); in this scenario two different versions of the movie according to options 106 and 107 are to be streamed over the network. In case only the user 104 is watching (and interacting with) the movie, only one version of the movie needs to be streamed (according to the decision made by the user 104).

The scenario shown in FIG. 1 can be realized as a network solution, i.e. the movie is conveyed via the network to at least one user or subscriber. Each user may have a device, e.g., a set-top box and/or a client software. A middleware and a video server may be used conveying the movie content to the users.

It is noted that the movie is an exemplary data (stream) or content. The data (stream) may in particular provide audio and/or video data. The data may be sent via broadcast or multicast to at least one user or subscriber. Also unicast transmission can be used to reach a device of a user.

Considering gaps or delays in the video stream received by users due to selection activities, buffers or storage media for buffering could be provided. Preferably, the time during which a users choice is accepted may be limited or restricted to a particular time window in order to ensure substantially the same delay for all users. This may be beneficial, because a choice of one user may affect the content of the other users and all users may preferably experience the movie (substantially) similarly. It is possible for the movie to pause after a selection is offered for a predetermined amount of time. If no input is provided within this amount of time, the system (server or middleware) may automatically select a choice (e.g., a default choice, wherein the default choice may be a choice that has been made by at least one other user) for the user to ensure that the movie can continue for all users. It is in particular noted that the predetermined amount of time may be flexibly set and it may in particular depend on how many users joined the interactive movie experience. For example, if only a single user watches the movie and utilizes the movie's interaction capability, the pause may be rather extended until the user decides which choice he would like to make.

Figure 2:
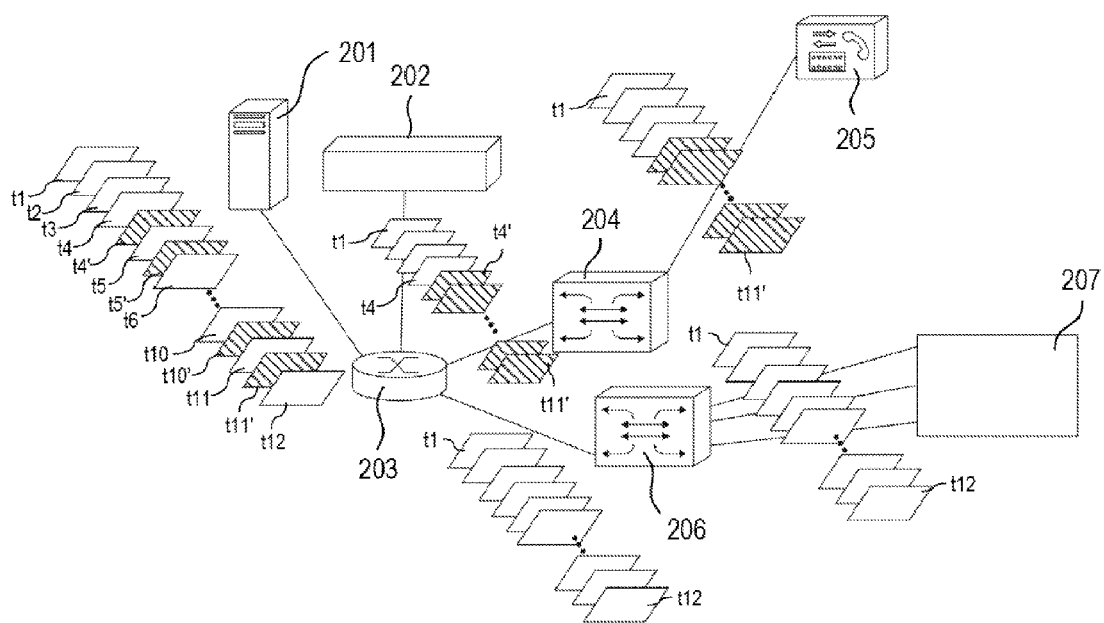
FIG. 2 shows an exemplary network architecture comprising a video server and a middleware both connected to a router, wherein a DSLAM connects the router to at least one user's device, who plays an active role in the interactive movie.

FIG. 2 shows an exemplary network architecture comprising a video server 201 and a middleware 202 both connected to a router 203. A DSLAM 204 connects the router 203 to at least one users device 205, who plays an active role in the interactive movie, and a DSLAM 206 connects the router 203 to devices 207 of non-interactive users joining a mere broadcast service.

The user via the device 205 makes a choice before or at or after the scene t3 (see also FIG. 1), said choice is conveyed via the device 205 in upstream direction (e.g., via the middleware 202) to the video server 201. The user located at the device 205 is then supplied with a data stream according to the choice made, whereas the devices 207 continue to receive the original default data stream. Both streams to device 205 and to devices 207 are separated by the router 203 in the figure: Towards the DSLAM 204 and the device 205 both streams are transmitted and towards the DSLAM 206 and the devices 207 only one (the default) stream is transmitted.

The device 205 may be a set-top box (STB) comprising a client application that allows the user to make the choice as how the movie should continue. The time window for a choice to be made and associated metadata can be supplied or inserted by the middleware 202 and transmitted downlink to the device 205. Pursuant to this information provided by the middleware, the user may have different possibilities to interact with the movie, e.g.

the movie may pause, and a pop-up window may open indicating different options for the user to select;

options may be indicated as subtitles during the movie or when the movie freezes;

at least one picture-in-picture may appear on the screen, wherein several (small) pictures may indicate an image associated with each of the options to choose from;

an information is extracted directly from at least one sensor (a sensor may detect a movement of the user or of a user's device);

an information from the user (e.g., continuously or at given time intervals) is gathered (e.g., via voice recognition, via text inserted, via a remote control, via gestures detected by a camera and gesture recognition software, etc.).

The user interface of the STB may in particular enable the user to discuss decisions with other users, e.g., users of a multicast group that experience the same interactive movie. It is also an option to make joint decisions with other users, e.g., of a social network. The joint decision might be based on a voting mechanism, wherein the plurality of votes may decide which choice to make.

For example, a user may be presented a menu to select one of the options presented via a remote control. Two exemplary options may be "enter the right door" or "enter the left door". The choice can be made via a remote control activating either one of the options presented.

Implementation and Advantages

The solution in particular allows networked users to interactively compose a video (e.g., from previously recorded components of the movie), to share such a common video experience and to distribute the video across the network.

A mechanism for multicasting and/or broadcasting a video stream is provided, said video stream being composed based on choices made by at least one user. The choices can be made during predefined or configurable time windows. It is also an option that an automatic selection of choices occurs at a later time of the movie based on the actual content and/or the story of the movie.

Advantageously, the movie has a predefined setting of choices, also referred to as the default movie, which is optionally conveyed to at least one user that does not opt for interactive services (see also FIG. 2).

A dynamic allocation of multicast channels can be used in order to avoid having the user to navigate among thousands of current static transmissions in order to select a channel. After a personalized content is transmitted (which may have been recorded by the user) the channel is reused for other transmissions; if the personalized content is transmitted to other users (e.g., friends) of a Web2.0 or 3.0 application, it will preferably be valid only as long as the stream is being transmitted. After that the resource is freed and can be re-allocated.

Hereinafter, two alternative implementations are described, i.e. an implementation for independent viewers and an implementation for multiple viewers in the network.

Independent Viewer Implementation

In this exemplary implementation, a choice made by one user does not affect the other users viewing the video. Hence, whenever a choice is made, two possibilities may occur:

The choice made corresponds to the default storyline, hence nothing changes; or a new storyline needs to be created; hence, a new stream for that user is required, which will be different from the video stream received by the other users.

This embodiment corresponds to a dynamic creation of multicast channels whenever necessary, wherein the user is automatically switched to the new multicast channel. The user can then let friends know the multicast channel number to join the personalized channel or the user may share that information via social web applications, e.g., Facebook, Twitter, etc.

A friend can join and from then on make a decision that changes the storyline, thereby dynamically creating another multicast channel (or joining another multicast channel if such is meanwhile created for another user), that is different from the channel he had joined originally. Hence, this does not result in a channel per user, but in one channel per set of users, who made the same decision.

This scenario of a dynamic viewing experience can be applied to different scenarios, such as, for instance:
  (a) A user as an independent viewer can ask at least one friend from his social network to watch his current version of the story. This can be achieved by sending an allowance certificate to at least one friend, comprising a channel identification and/or a multicast address or a group reference to the dynamic multicast channel of the user's storyline.
  (b) A user as an independent viewer can ask friends from his social network to form a network viewers group when they join the current version of the story, e.g., friends get an allowance certificate, a channel ID and/or multicast address or group reference to the dynamic multicast channel of the storyline, wherein all participants can be registered as networked viewers. A dynamic multicast channel can be created to separate these users from other independent users.
  (c) A user as a networked viewer asks friends from his social network to join and participate on his current version of the story, e.g., friends get an allowance certificate, a channel ID and/or multicast address or group reference to that dynamic multicast channel of that storyline.

It should be readily understood that (other) combinations are also possible.

In all these scenarios, the system (e.g. middleware) can check the allowance certificate (the user or the STB may therefore inform the middleware of the creation of that certificate so that it can be validated).

Figure 3:
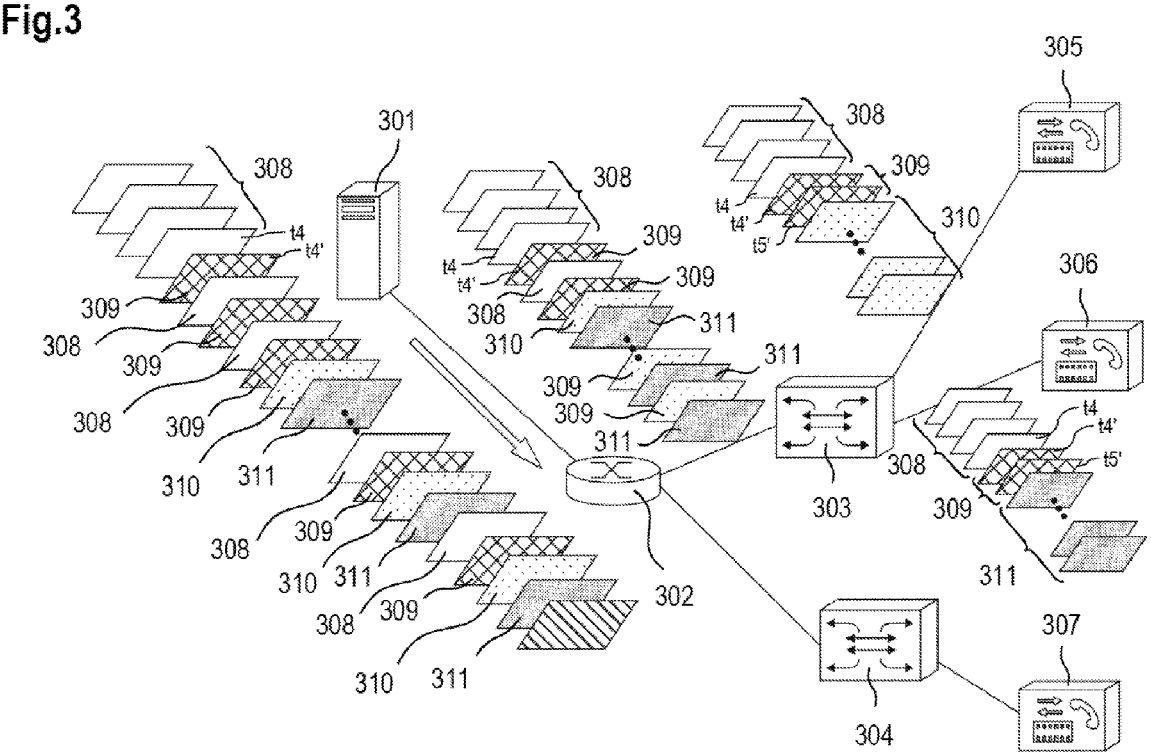
FIG. 3 shows an exemplary independent users implementation comprising a video server connected to a router, wherein a DSLAM connects the router to user devices.

FIG. 3 shows an exemplary independent users implementation comprising a video server 301 connected to a router 302. A DSLAM 303 connects the router 302 to a users device 305 and to a users device 306. A DSLAM 304 connects the router 302 to a user's device 307. Although DSLAMs (e.g., for xDSL access Networks) or any other access technology could be used with the solution presented herein.

A choice made by a user does not affect or change the content received by any other user. The device 305 at the beginning receives an original data stream 308 comprising scenes t1 to t4; this also applies to the device 306. The users of both devices 305 and 306 make the same choice after scene t4 and receive the same data stream 309 comprising scenes t4' and t5'. After scene t5', the users of the devices 305 and 306 make different choices: The user of the device 305 wants to continue with a data stream 310 and the user of the device 306 wants to continue with a data stream 311.

The user of the device 307 may select a personalized movie or join one of the data streams conveyed to either device 305 or device 306 pursuant to an invitation of any of the users of these devices 305 or 306. As an alternative, the device may receive a different (personalized) data stream.

It is noted that a scene could also be referred to as frames or any other portion of the content that is conveyed from the video server 301 to at least one of the devices 305 to 307.

It is also noted that a Protocol Independent Multicast (PIM) could be also used as a multicast routing algorithm for the solution presented.

The approach presented herein in particular suggests starting with a source-based multicast (i.e., corresponding to a dense multicast tree). With end-users making choices, the rendezvous point approaches the end-user (as new choices are made, the tree become more sparse with more users receiving individualized personalized streams at their STBs).

Although the dense and sparse versions of the PIM protocol could be used, the solution presented (by also following an opposite approach, i.e. multicast from dense to sparse) may also be used with other multicast protocols.

Figure 4A:
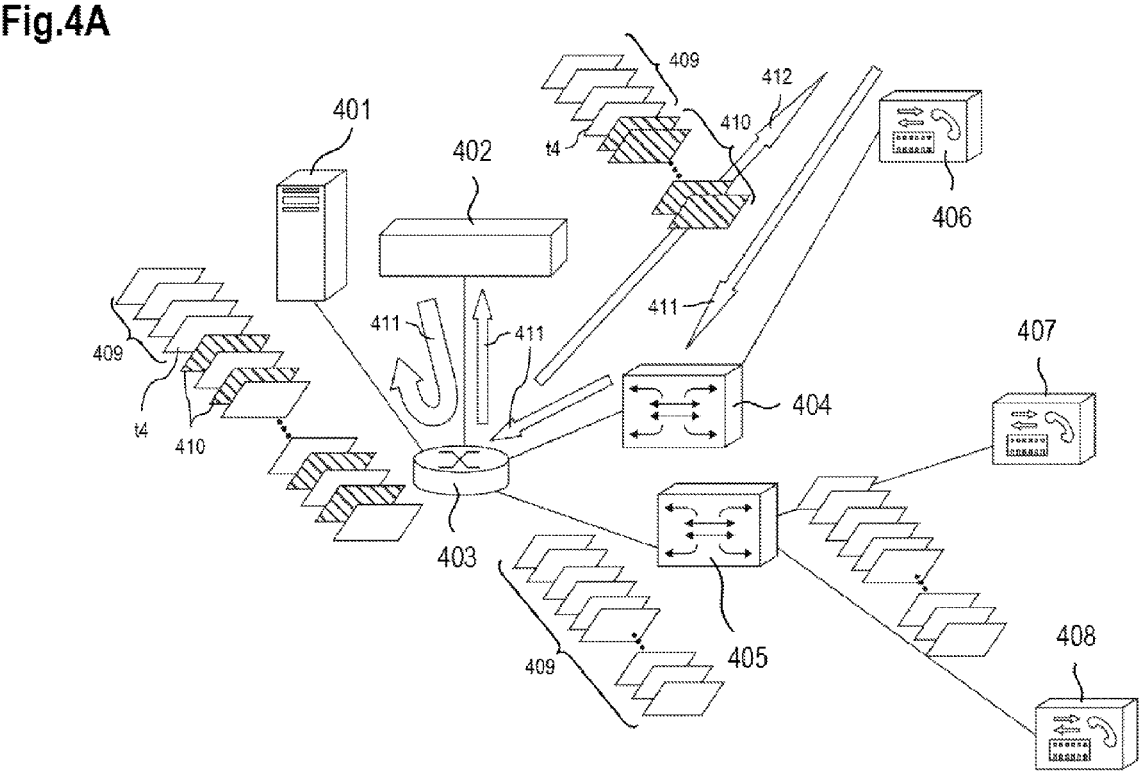
FIG. 4A and FIG. 4B each shows an exemplary network architecture comprising a video server and a middleware both connected to a router, wherein two DSLAMs connect the router to several user devices.

FIG. 4A shows an exemplary network architecture comprising a video server 401 and a middleware 402 both connected to a router 403. A DSLAM 404 connects the router 203 to at least one users device 406 and a DSLAM 405 connects the router 403 to devices 407 and 408.

Initially, all devices 406, 407 and 408 receive the same data stream 409. After (or during) a scene t4, a user at the device 406 makes a choice (an according message 411 is conveyed via the DSLAM 404 and the router 403 to the middleware 402, which informs the video server 401 accordingly) and thereon receives a different data stream 410 from the video server 401 (it is noted that the video server 401 may contain all possible data streams). The devices 407 and 408 both receive and continue receiving the default data stream 409. Hence, after the scene t4, the video server 401 forwards the data stream 410 to the router 403 for the device 406 and the default data stream 409 for the devices 407 and 408. The router 403 forwards the different version of the data streams 409 and 410 to the device 406 (via the DSLAM 404, see arrow 412) and the default data stream 410 to the devices 407 and 408 (via the DSLAM 405). Hence, the router 403 acts as a rendezvous point.

Figure 4B:
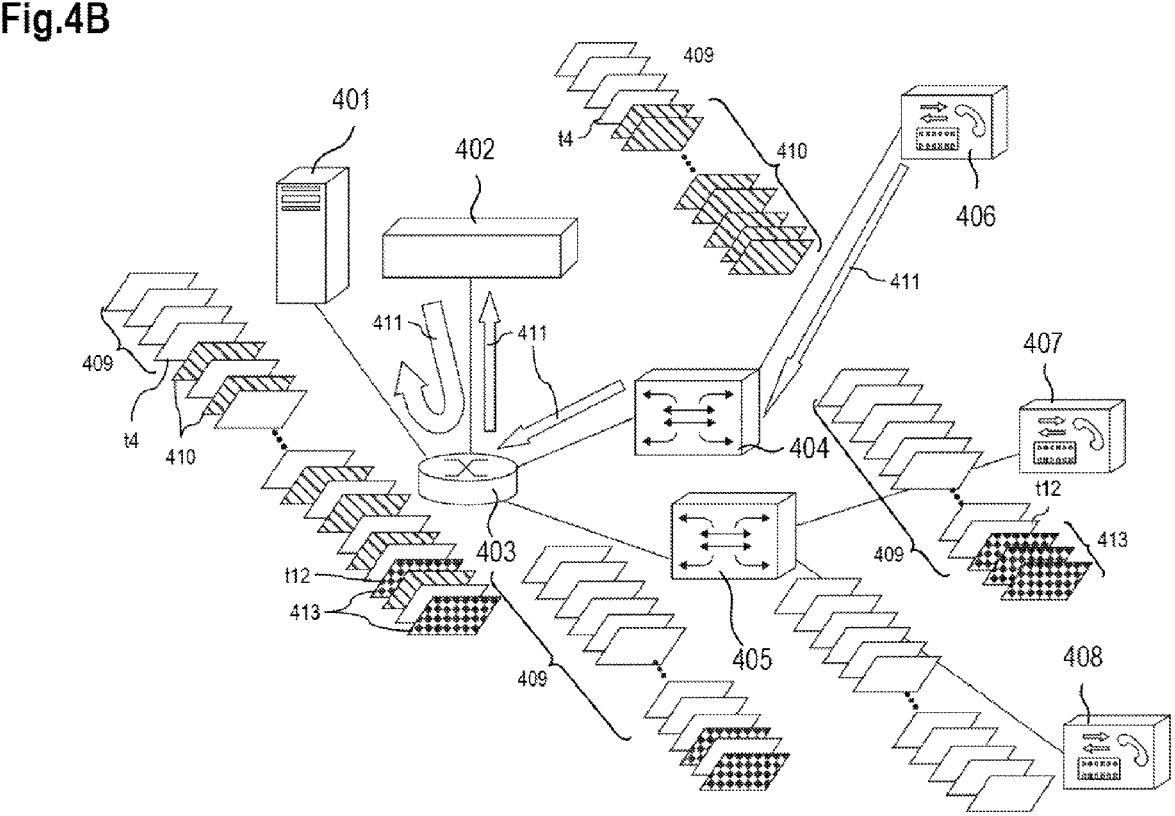

FIG. 4B shows the exemplary network architecture of FIG. 4A. However, in this example only the device 408 receives always the default data stream 409. After (or during) a scene t12, a user at the device 407 makes a choice and thereon receives a data stream 413 from the video server 401. Hence, the video server 401 after the scene t12 conveys the default data stream 409 and the data stream 413 via the router 403 to the DSLAM 405. The DSLAM 405 forwards the data stream 413 to the device 407 and the default data 409 stream to the device 408.

It is noted that the arrows 411 in FIG. 4A and FIG. 4B correspond to signaling data conveyed via a control plane, whereas the scenes of the data stream are transmitted over a user data-plane.

Networked Viewers Implementation

An alternative solution corresponds to users viewing data streams in a network scenario, wherein a choice of at least one user changes the content received by the other users. In this scenario, all users may obtain the same version of the data stream (video, movie) in parallel, i.e. at (substantially) the same time. Each time a user makes a choice, that choice is conveyed via the control plane to the middleware and a new video stream is sent to the user devices. Hence, the choices can be combined leading to a data stream that is based on various choices made by at least one user in particular by several users. This scenario is in particular useful in case each user is assigned to a character or identity of the data stream and can make choices for this character or identity.

FIG. 5 shows an exemplary network architecture comprising a video server 501 and a middleware 502 both connected to a router 503. A DSLAM 504 connects the router 503 to users devices 506, 507 and a DSLAM 505 connects the router 503 to a user's device 508. The router 503 could be an IGMP multicast router.

The video server 501 provides all portions of data streams. In the example shown in FIG. 5, the video server 501 provides the following scenes:
- a default data stream comprising the scenes t1_1 to t8_1;
- a first alternative data stream after a scene t3, starting with scene t4_2;
- a second alternative data stream after a scene t5, starting with a scene t6_3;
- a third alternative data stream after the scene t5, starting with a scene t6_4;
- a fourth alternative data stream after a scene t7, starting with a scene t8_5.

Hence, it is noted that the appendix "_i" indicates the data stream number i, wherein to refers to scene number n.

The device 506 joins the data stream at the beginning (i.e. scene t1_1). The device 506 may inform (via messages 509, 510) the devices 507 and 508 that they can join the actual data stream at a predetermined scene, e.g., t1_1 (or any other scene). The device 507 joins the data stream at the scene t1_1.

After or during the scene t3_1 a choice is made by the user of the device 506 to continue with the scene t4_2 (see control message 511).

The device 508 joins the data stream at a scene t5_2. After or during the scene t5_2 a choice is made by the user of the device 508 to continue with the scene t6_3 (see control message 512).

Hence, the user who joined the data stream can also make a choice even if this user did not initially start the data stream. It is noted, however, that such interaction can be restricted, e.g., dependent on a confirmation from the originating (or any other) user. It is also an option that the users that joined the data stream exchange information, e.g., via a control channel, before making the actual choice that determined as how the storyline or movie continues. It is in particular an option to establish a (weighted) voting mechanism to allow several users to decide which choice to make.

This voting mechanism is also advantageous if some of the users' choices are mutually conflicting. Such a conflict can arise, e.g., in case two networked users are controlling the choices of the same character.

It is also an option that each user picks an identity, e.g., a character, of the data stream and makes choices for this character. This can lead to independent choices made by the users of the devices 506 to 508, wherein the resulting data stream conveyed to these devices from the video server 501 is the same.

Hence, the scenario of FIG. 5 in particular visualizes as how a choice of a single user affects the content viewed by all users.

There exist in particular two variations as how to implement such a scenario:

(a) Multi-Channel Implementation

This implementation requires significantly less bandwidth than the unicast case.

In a broadcast scenario, independent users that are already receiving scenes a newly defined networked group requires does not lead to extra multicast channels for this networked group. Hence, if k different storylines (via data streams) are already conveyed to the users, no additional multicast channel is required.

This multi-channel implementation hence allows reusing content (and thus saving bandwidth) that is already transmitted to independent viewers watching the same storyline (version of a multimedia information or content).

For example, a networked viewer user 1 after or during a scene t1 makes a choice to further watch a non-default alternative of a video and all other networked users 2 to m of his group make default choices (which do not have a conflict with the choice made by the user 1). An independent user that is not part of the group (1 ... m) during or after the scene t1 makes the same choice as the networked viewer user 1. Hence, although various entities (independent viewer and networked group) are watching the same content, all users receive content from the same channel that can be dynamically assigned. Hence, if the m independent users of the group are already receiving m different storylines, and in case there are k networked groups (with k>m) watching k storylines (which include the m storylines), then the total number of storylines to be transmitted by the video server amounts to k (not to k+m).

Advantages:
- This implementation is in particular promising for broadcast scenarios. In case several storylines are transmitted via broadcast to different groups of networked users, each storyline can be assigned a virtual channel number, but no extra bandwidth is required for transmitting all storylines.
- If several users are (also) watching the data stream as independent users, all channels (or a subset thereof) containing the individual versions are already available. Hence, the new channel created for the networked data stream works as a virtual channel, i.e., can be built based on content from at least one other channel.

It is assumed that initially there is no dynamic multicast data streamed. The user of the device 506 may select via an STB menu of the device 506 a channel or program to watch. For example, the device 506 sends an IGMP join message (step 1) at a time prior to the scene t1. This join message reaches the DSLAM 504, which, without being aware of any suitable data stream, propagates it to the router 503 (which can be realized as an IGMP multicast router). The router 503 may interact with the middleware 502 in order to have the video server 501 to start streaming the video or data stream requested by the device 506. The other devices 507 and 508 (upon user request) may then join the multicast session, e.g., at the scene t1 (step 2).

In a step 3, the user of the device 506 makes a choice that has an impact on the content starting at scene t4. Hence, the device 506 sends an IGMP join message (if IGMP is used) to join the multicast channel corresponding to the new storyline (i.e. requesting scene t4_2 of a different data stream). This triggers the video server 501 to start transmitting the correspondent content via a new multicast channel. Accordingly, the router 503 gets the scenes t4_1, t5_1, etc. from the default data stream and the scenes t4_2, t5_2 of this additional data stream (chosen by the user of the device 506).

However, the other users of the devices 507 and 508 (all devices 506 to 508 are associated with the same group) may advantageously have to become aware of the choice made by the user of the device 506. This can be achieved, e.g., as follows:

(i) The user of the device 506 informs the other users (of the devices 507 and 508) about the choice he made. In such case, a message can be sent to all other users (devices 507, 508) of the multicast group. This message can be sent via the network or via a separate logical or physical communication channel.

(ii) The middleware 502 may disseminate such message and inform the other users (devices 507, 508) of the multicast group.

(iii) The user of the device 506 can generate and send a join message automatically on behalf of the other users (devices 507 and 508).

In a step 4, the user of the device 508 makes a choice that has an impact on the content starting with the scene t6. Similarly to step 3 above, the other users (devices 506 and 507) need to join a new multicast channel receiving the scenes t6_3, t7_3, etc.

In case a user wants to switch to a different data stream (channel, movie, program), he (via his device) may send an IGMP leave message and stop receiving the data stream. If the data stream ends or if the last user (device) of a group dropped out, the transmission of this data stream from the video server 501 can be stopped. Resources (multicast channels) can be released and otherwise utilized.

(b) Single Channel Implementation:

In this case, only one dynamic multicast channel is required per storyline. A new multicast channel can be created for a group of networked viewers, independent from the content that is transmitted to independent viewers (which in particular corresponds to the scenario of non-broadcasted content). Hence, k storylines require k multicast channels, independent of the number of independent users receiving the same content. In this case, the total number of storylines transmitted may amount to k+m.

In both implementations (a) and (b), there are several possibilities for the video server to transmit the multiple versions of the video, e.g.:

(1) In the unicast scenario due to the reduced performance, high bandwidths are required.

(2) In the broadcast scenario (i.e., in case all versions of a movie or content are transmitted): As all k versions of the storylines have the same beginning and as k−1 versions share the same storyline after a single choice, this option saves a significant amount of bandwidth compared to the unicast scenario.

(3) A multicast of storylines can be used as required, i.e., upon users making choices leading to additional storylines that are conveyed via multicast channels. IGMP can be used for establishing, maintaining and de-allocating multicast groups and/or multicast channels. A choice of a user can be implemented as if the user switched a channel; IGMP can be used for the user to join a new data stream. This allows significantly reducing the amount of traffic on the network.

In case of a networked (multi-)viewers implementation, this option may require all other users to switch to a new multicast channel, i.e. a new storyline of the data stream whenever a user makes a choice (i.e. selects a new storyline). This can be realized via the middleware synchronizing such information between the devices involved.

In case of an independent viewers implementation, this option may require the user that makes a choice to join (switch to) a new version of the data stream that is conveyed via multicast.

Dealing with Delays Based on User Choices

If a forking point occurs after a scene t1, all choices are preferably made before the upcoming scene t2 begins. In other words, the choice shall be made during the scene t1 or prior to this scene t1. It is an option to wait at the end of the scene t1, e.g., for a predetermined amount of time that allows the user to make the choice. However, it is an option that after this amount of time lapsed, a default choice is made by the system (e.g., the middleware, the device or any other component).

The choice can be made by several users and the information regarding such choice may arrive at the middleware at different moments in time.

In the networked viewers scenario, in which every user of the multicast group may make a choice and thus may interactively change the storyline, a delay between such choices can be handled as follows:

User choices that are made before a time T1 are sent to the middleware. So, at a time T1+$\Delta$ (wherein $\Delta$ may be a pre-configured amount of time that does not deteriorate the quality of experience (QoE), but allows sufficient time for the choice made to arrive prior to time T1 at the middleware), the middleware requires that all choices from the users are received. If a choice did not arrive prior to that time T1+$\Delta$, it can be assumed that this particular user did not make a choice and his device did not send a trigger—a default option may be chosen for this device.

The middleware then initiates the video server to send the data stream to the multicast router based on the choice(s) made and/or the default option(s).

Other alternatives are feasible as well. If all users are for instance on the same local network, a DSLAM or an edge router could be used collecting the information (instead of the middleware) and requesting the correspondent scenes based on the choice(s) made and/or the default option(s). It is also an option that the middleware functionality is implemented within a device that already exists in a network structure, e.g., said router or DSLAM.

Figure 6:
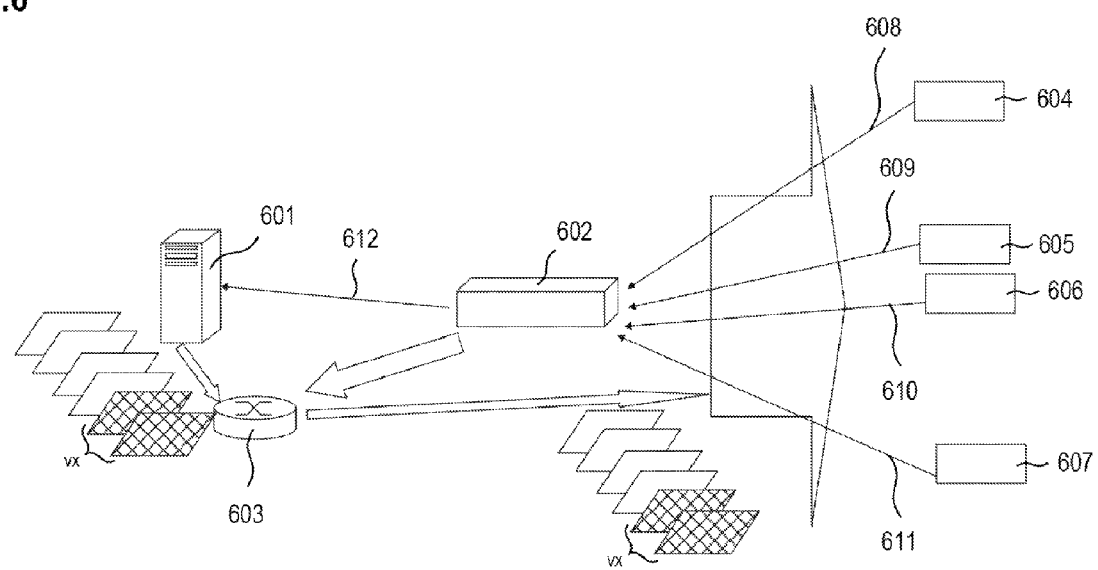
FIG. 6 shows an exemplary network architecture according to the networked viewers scenario comprising a video server and a middleware both connected to a router, wherein the router is connected to user devices through access networks, which convey delayed triggers based on user choices to the middleware.

FIG. 6 shows an exemplary network architecture comprising a video server 601 and a middleware 602 both connected to a router 603. The router 603 is connected (e.g., via at least one DSLAM, not shown) to devices 604 to 607. The devices 604 to 607 may be STBs that communicate with the middleware 602 via the router 603. The router 603 could be an IGMP multicast router.

FIG. 6 refers in particular to the networked viewers scenario. Each user at his STB 604 to 607 adopts a role of a character in a movie conveyed by the video server 601 via, e.g., streaming data. Hence, each user (via the associated STBs 604 to 607) may make choices at different points in time, i.e. at forking points or leading to forking points. Each choice (or at least a portion of choices) may lead to a different storyline, i.e. different scenes to be conveyed to the networked users.

Due to network delays, the choices made and transmitted from the STBs 604 to 607 arrive at the middleware 602 at different points in time. For example, a choice 608 transmitted from the STB 604 arrives at the middleware 602 at a time Ta, a choice 609 transmitted from the STB 605 arrives at the middleware 602 at a time Tb, a choice 610 transmitted from the STB 606 arrives at the middleware 602 at a time Tc and a choice 611 transmitted from the STB 607 arrives at the middleware 602 at a time Td. It is noted that the choices could be separate or identical choices and could be conveyed via messages, e.g., via control messages.

The choices 608, 609 and 611 arrive within an admissible time window, i.e. prior to a time amounting to T1+$\Delta$max. The middleware 602 thus assumes that STB 603 did not make a choice (the choice made arrives too late and is discarded) and assumes a default choice for STB 606 (as an option, the STB 606 may be notified about the default choice).

The choices 608, 609 and 611 and the default choice for STB 603 are used by the middleware 602 to determine the right version vx (as a function based on all the choices 608, 609, 611 and default choice).

Hence, determining the version vx can be summarized by the following table:

| STB | 604 | 605 | 606 | 607 |
|---|---|---|---|---|
| Choice | 608 | 609 | Default | 611 |
| Version | | vx = function of choices | | |

This version vx is communicated via a message 612 to the video server 601, which starts transmitting the according data stream to the STBs 604 to 607. The STBs 604 to 607 thus receive this version vx of the data stream starting at a time T1+Δmax.

Figure 7:
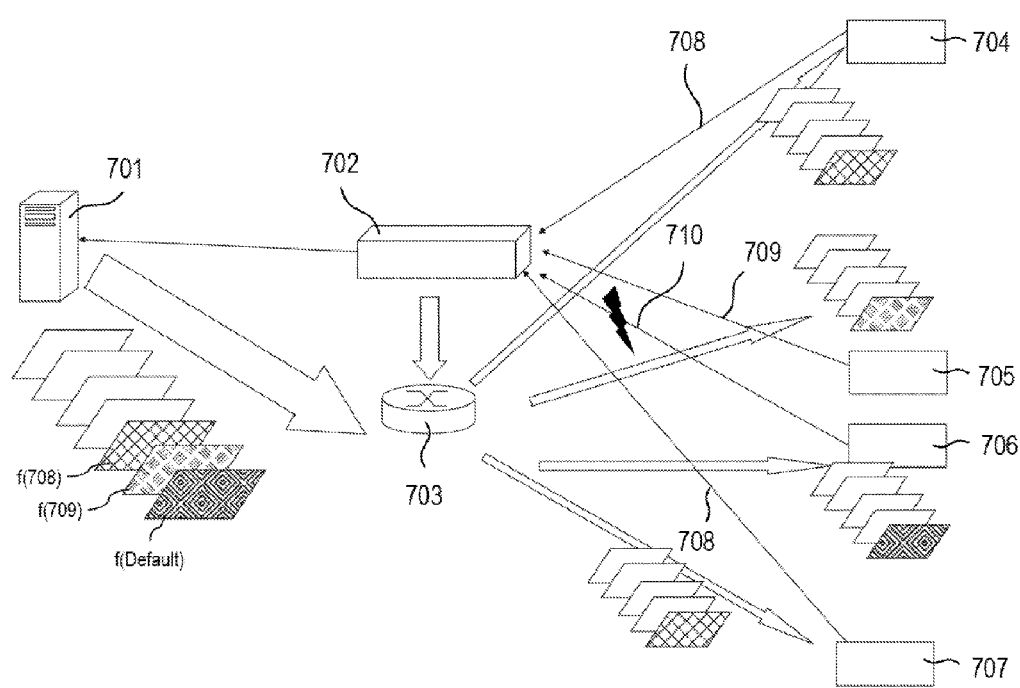
FIG. 7 shows an exemplary network architecture according to the independent viewers scenario comprising a video server and a middleware both connected to a router, wherein the router is connected to user devices through access networks, which convey delayed triggers based on user choices to the middleware.

With regard to the independent viewers scenario (i.e., one user's choice does not affect or change the storyline of another user, see above) there are in particular the following options:

(1) FIG. 7 shows an exemplary network architecture comprising a video server 701 and a middleware 702 both connected to a router 703. The router 703 is connected (e.g., via at least one DSLAM, not shown) to devices 704 to 707. The devices 704 to 707 may be STBs that communicate with the middleware 702 via the router 703. The router 703 could be an IGMP multicast router.

FIG. 7 refers in particular to the independent viewers scenario. Each user at each of the STBs 704 to 707 interactively makes his choice at a time prior to a forking point (in particular prior to a scene after a forking point). Due to network delays, the choices made by the users and conveyed by the STBs 704 to 707 arrive at the middleware 702 at different points in time.

For example, a choice 708 transmitted from the STB 704 arrives at the middleware 702 at a time Ta, a choice 709 transmitted from the STB 705 arrives at the middleware 702 at a time Tb, a choice 710 transmitted from the STB 706 arrives at the middleware 702 at a time Tc and a choice 711 transmitted from the STB 707 arrives at the middleware 702 at a time Td. It is noted that the choices could be separate or identical choices and could be conveyed via messages, e.g., via control messages.

The choices 708, 709 and 711 arrive within an admissible time window, i.e. prior to T1+Δmax. The middleware 702 thus assumes that STB 703 did not make a choice (the choice made arrives too late and is discarded) and assumes a default choice for STB 703 (as an option, the STB 703 may be notified about the default choice).

The middleware 702 may determine the version to be made available for each of the STBs 704 to 707 based on the choices made and the default choice(s), which can be summarized by the following table:

| STB | 704 | 705 | 706 | 707 |
|---|---|---|---|---|
| Choice | 708 | 709 | Default | 708 |
| Version | f(708) | f(709) | f(Default) | f(708) |

Hence, the respective versions f(708), f(709) and f(Default) are conveyed to the video server 701.

It is noted that in the example shown in FIG. 7, the STBs 704 and 707 make the same choice 708, i.e. convey the same trigger in time. Hence, the middleware 702 only needs to request the version the data stream f(708) from the video server 701 for both STBs 704 and 707.

The video server 701 may then start transmitting the according data streams to the STBs 704 to 707. The STBs 704 to 707 thus receive their versions requested starting at a time T1+Δmax.

In order to avoid any loss of frames between a point in time T1 and a point in time T1+Δmax, the content around forking points could be identical (so the differences cannot be perceived by the user).

(2) A first user may make a choice at a time T1+Ta1:

The middleware and/or any further component checks whether there is already a transmission of the correspondent stream (e.g., a second user may have previously made the same choice at a time T1+Ta2, with Ta2<Ta1). If this is the case, the first user may join the (already existing) data stream (channel) that is conveyed to the second user. If this condition is not met, the first user can be the first to join a data stream based on his choice, the middleware may trigger the video server to convey this (separate) data stream towards the first user; the second (or any third) user may then later join this data stream (Ta2>Ta1).

Hence, in case the durations Ta1 and Ta2 are (very) small, some lost frames may not result in a poor quality perceived by the device of a user being late joining the data stream. Therefore, devices that are join a data stream "close" to each other (i.e. making the same choice within a predetermined time window Tw, i.e. |Ta1−Ta2|<Tw) may substantially commonly join this data stream that is conveyed by the video server based on the choice made by one of the users.

For example, the first user may already get the video and the second user may then "jump" on that data stream, i.e. also obtain the same video, because this choice was made within the time window Tw.

Figure 8:
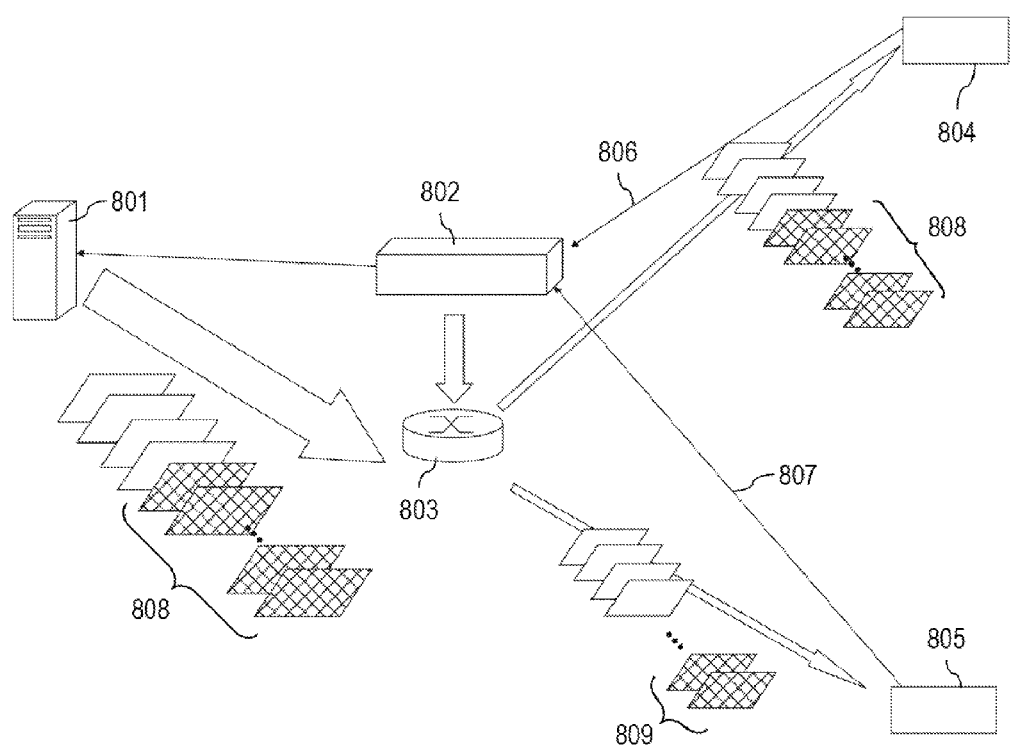
FIG. 8 shows an exemplary network architecture comprising a video server and a middleware both connected to a router, wherein the router is connected to user devices through access networks, wherein one user device sends a trigger to join an already transmitted data stream with some delay.

FIG. 8 shows an exemplary network architecture comprising a video server 801 and a middleware 802 both connected to a router 803. The router 803 is connected (e.g., via at least one DSLAM, not shown) to devices 804 and 805. The devices 804 and 805 may be STBs that communicate with the middleware 802 via the router 803. The router 803 could be an IGMP multicast router.

The devices 804 and 805 supply data streams to independent viewers. A choice 806 made by the user of the device 804 is transmitted towards the middleware 802 at a time Ta and a choice 807 made by the user of the device 805 is transmitted towards the middleware 802 at a time Td. It is noted that the choices 806, 807 could be separate or identical choices and could be conveyed via messages, e.g., via control messages.

In the example shown in FIG. 8, the choices 806 and 807 are directed to the same data stream, i.e. the users of the devices 804 and 805 want to watch the same movie. According to the example, the choices 806, 807 are made at different times Ta and Td, e.g., Ta<Td: The middleware 802 after having obtained the choice 806 triggers the video server 801 and the router 803 to convey a data stream 808 indicated by the choice 806 towards the device 804.

At the later time Td, the device 805 indicates the choice 807 to the middleware 802, said choice 807 being directed to the same movie, i.e. data stream, as was the choice 806. The middleware 802 informs the router 803 to also convey the corresponding data stream to the device 805. A data stream 809 that is based on the choice 807 arrives at the device 805.

Compared to the data stream 808, some frames or scenes may be lost in the data stream 809, because of the late choice made at the device 805.

(3) There may also be some (small) delay between the choice made and the data stream received at the device at which the choice was made (e.g., trigger sent to the middleware). In such scenario, all users may experience a small delay and users may join a particular data stream (e.g., movie) at a later time thereby loosing information (e.g., frames). A time limit (or window) could be set defining a time restriction until which a user (via his device) shall have joined the movie. Exceeding such time limit could be deemed losing too many frames and thus may not be admissible.

It is, however, also an option that beyond such a time limit another multicast channel is created for this device that wants to obtain a particular data stream. Hence, instead of allowing this device to join a data stream that has already started, a new (e.g., multicast) channel can be created for transmitting this data stream again from its beginning. For this new channel, a time limit can be defined that allows other users to join the data stream (as described above). The middleware may coordinate the efforts of devices that want to join a data stream by creating such a channel and thus allowing as many devices as possible to join the movie (e.g., within a predefined time frame or window).

The middleware may even decide based on properties and/or parameters (e.g., quality of service, data rate, delay, etc.) which devices to combine for one data stream (i.e., which device to join a particular data stream). For example, devices that experience large delays may be supplied by a first channel and devices that experience no or minor delays may be supplied by a second channel; the selection or grouping of the devices can be conducted by the middleware. Hence, an additional device with a large delay may join the first channel. Accordingly, unicast or multicast channels can be created by the middleware based on properties and/or parameters.

A solution provider may also create different service packages for client subscription according to different quality of service levels.

Recording

A recording entity at the client (also referred to as client PVR or cPVR) is a promising solution in case the user is not at home. The device comprising or having access to such cPVR may record the (default) data stream. If the user (as independent or as a networked viewer) is watching a personalized version, the cPVR can record this personalized version.

It is also an option that a recording entity at the network side (also referred to as network PVR or nPVR) is provided which can be used to record all versions of a data stream (e.g., movie) that are possible due to choices made (or a selection thereof). This can be an interesting scenario if the user only watches a specific version of such movie or in case the user is not watching the movie at all. Hence, regardless of the actual choices made by the user, all versions of the movie can be stored and thus made available.

According to a further option, the user may watch the recorded version making choices, wherein an interactive menu could be provided offering at least one of the following selections:

The user may select watching his version of the content or any other version recorded.

The user may toggle (switch on or off) watching his (or his network group's) selection dialog when watching the correspondent version.

The user could select a specific version with pre-defined selections or the user may opt watching the recorded video in an interactive mode (e.g., making choices while watching the movie). The choices for the user are in such scenario in particular restricted to the versions that have been recorded (which may be relevant if not all versions have been recorded). For example, the larger the number of versions of the movie that was watched (or is watched) and recorded, the more options the user has at a later time to make choices while interactively watching the recorded data stream(s).

It is also an option that the user has all choices available. If a choice leads to a data stream that was not recorded, the device (e.g., STB) can, e.g., request this data stream from the middleware.

At the end of the movie or video, an overview can be given to the user showing the choices he or his group has made, e.g., together with further choices possible or choices made by another user or group of a social network.

Figure 9:
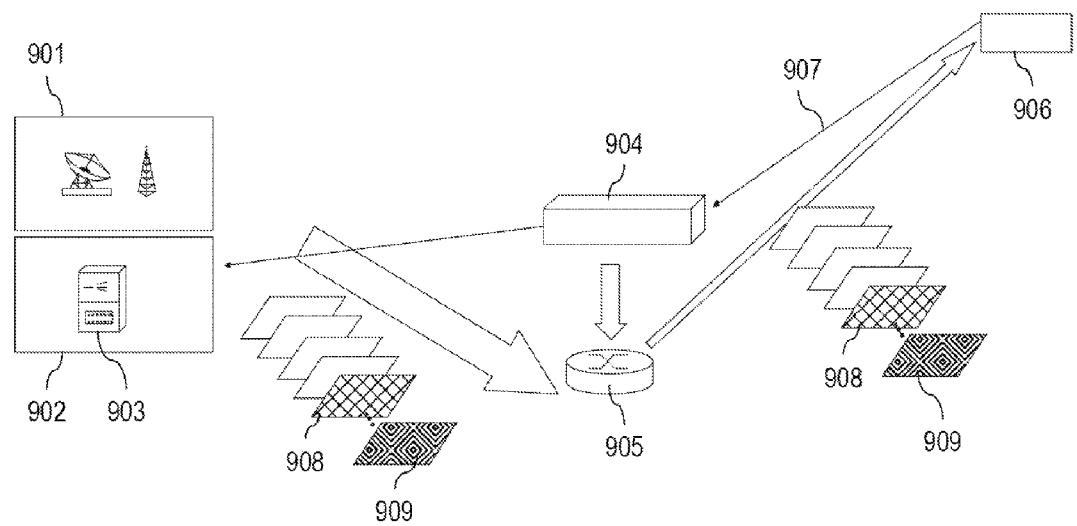
FIG. 9 shows an exemplary network architecture comprising an IPTV head end and a VoD head end with a video server, wherein the VoD head end and a middleware are connected to a router and the router is connected to a user device through access networks.

FIG. 9 shows an exemplary network architecture comprising an IPTV head end 901 and a VoD head end 902 with a video server 903. The VoD head end 902 and a middleware 904 are connected to a router 905. The router 905 is connected to a device 906, e.g., a STB that may communicate with the middleware 904 via the router 905. The router 905 could be an IGMP multicast router.

A user of the device 906 makes a choice and triggers a message 907 generated at the device 906, which is forwarded to the middleware 904 and arrives at the middleware 904 at a time T1. The middleware 904 requests transmission of recorded content corresponding to the choice indicated in the message 907 from the VoD head end 902. A recorded version according to this choice (indicated by a first scene 908 of this choice) is then forwarded from the VoD head end 902 via the router 905 to the device 906.

Later, the user of the device 906 makes an interactive choice for another scene, said choice being conveyed to the middleware 904 accordingly and the middleware 904 requests the recorded content to be transmitted to the device 906. Hence, a first scene 909 according to this choice of the user is conveyed from the VoD head end 902 via the router 905 to the device 906.

Buffering

It is an option that buffering capabilities for the router are not much higher than in existing multicast networks.

For example, in the networked viewers scenario described herein, no separate buffering is required. In the networked viewers scenario, it is beneficial to have all choices collected (made by the users or assumed default choices) before transmitting the data stream. However, timing misalignments between transmissions can be avoided by using unicast data streams and/or buffering means.

Synchronization

It is one option that a user may in advance determine future choices.

For example, a user may select or define a parameter that affects the data stream or at least a portion thereof (e.g., the whole movie or scene he is or will be watching). Such choice can be regarded as a global choice that does not have to be limited to a forking point:

For example, a users choice may change the color of the sky (e.g., darker). After such choice is made, e.g., until the end of the movie or even beyond that, this choice is applied as a global parameter set for the movie (or for all movies in case the user always wants the sky to have a different color or brightness).

In contrast to a user inquiry driven request, any further forking points may consider this global choice and thus automatically make the decision based on this global choice.

The user's (global) choice can be based on at least one environmental condition: For example, the users choice may affect or change the weather in the movie and such change may affect at least one object in the movie, which may influence choices to be made along the storyline of the movie. Such choices can be made automatically based on the global choice (in this example: the weather) made by the user before. However, it is also an option that the user—despite said global choice—changes his opinion and overrides the automatic decision that would have been made according to his (previous) global choice.

Environmental conditions may also be real environmental conditions that could be provided to the STB automatically or by user input. For example, weather conditions at the STB's location could be retrieved from the Internet, time (day/night) could be determined from an internal clock (or the Internet), general user parameters or preferences could be determined via user interaction. Also sensor information of sensors located at the user's home, office, or any sensor information available, e.g., via a network (e.g., the Internet) can be used to obtain information for automated choices. It is also an option that the user uses a remote device, a body sensor or the like to provide information to the STB that could be used to automatically adjust the (e.g., global) choices to be made along the movie.

Also, the STB could determine preferences based on recent choices of the user and provide pre-selected choices according to a users profile.

All information determined and/or collected could be used for automatic choices, global choices or to give the user a pre-selection of choices that he may most likely follow. Then, the user can make it a global choice that leads to decisions that are made automatically when the storyline progresses or the user may discard a choice or he may decide to make (some or all) choices manually.

The user may change some video objects along the data stream (or a portion thereof) and thereby also (e.g., automatically) make some choices in advance that are based on this decision and thus influences the storyline of the movie.

For example, in a computer-generated cartoon movie (or in a movie with real persons) the user may change the faces of the characters according to a parameter or an option presented. This may have an effect for the rest of the movie and/or for another movie of the same type. Hence, as a global choice made by the user, a particular cartoon character may always be shown according to this choice (unless the choice is reset).

The user may "modulate" the storyline by selecting (e.g., at any instance of the movie) a parameter, e.g., increase or decrease a property of a movie character (e.g., kindness, strength, violence, speech, etc.). This can be done prior to any forking point and can automatically be considered at any upcoming forking point. Thus, the user independently from the actual forking point can adjust parameters according to his liking. The data stream can be continuously adjusted based on such choices or it may be adjusted at several forking points along the movie pursuant to the level set by the user.

Another application is related to 3D television. For example, at least two perspectives of viewing angles of a movie or scene can be recorded and transmitted in a superimposed manner. By using 3D glasses, the viewer filters one viewing angle of the scene to one eye, and the other viewing angle of the scene to the other eye. It is an option that additional viewing angles recorded can be provided and the user can select, e.g., in real-time (at pre-defined moments) the viewing angle of the 3D scene. For example, the viewer can place himself at the position of a goalkeeper during a soccer penalty or in the middle of a basketball game. It is an advantage of the solution presented herein that instead of creating in advance multicast channels for all 3D versions of a movie, only one multicast channel for a 3D version is created at the beginning and virtual dynamic channels of different 3D versions are created after they have been requested. This significantly reduces the overall load situation and allows providing 3D versions according to user demands. It is also an advantage that friends of a social network may select the same perspective (e.g., using the same position during a game or one user may watch the game from his goalkeeper's perspective while a friend watches the game from the other goalkeepers perspective). It is noted that for the use case of various 3D perspectives there may be a limited number of different 3D versions per movie or game, which also limits the maximum number of multicast channels required.

When a choice is made, the user may experience some delay until the adjusted data stream is received. It is also an option that the STB buffers video frames for (all or a portion of all) possible choices for a predetermined amount of time. Hence, the STB (for some time) receives frames from several data streams.

At a time T1, the options for a choice are $c1, c2, \ldots cn$. After the user makes a choice at a time $T1+\Delta$, the STB has to wait for the STB buffer to be filled with a sufficient amount of video frames. This can be alleviated by storing different versions of the data stream between the time T1 and $T1+\Delta$ in separate buffers $B1 \ldots Bn$, wherein Bi={buffer for frame at time $T1 \ldots$ buffer for frame at time $T1+\Delta$}. In this case, as soon as a user makes the choice ci, the STB starts playing the video from the buffer Bi according to that choice ci. This can be achieved by multicasting all versions of the video $1 \ldots n$ between time T1 and the time $T1+\Delta$ (for instance, using n-times the bandwidth required for just one version).

Channel Assignment of Video Portions

It will be discussed as how channel assignment of video portions can efficiently be conducted. This is in particular beneficial in order to avoid that the users obtain hundreds or thousands of channels which they can join via their selection menus (which, if not desired as a feature, could prejudice the usability for the user).

According to an approach that is similar to DHCP (dynamic host configuration protocol used for dynamic allocation of IP addresses) it is assumed, e.g., that a channel 7 is allocated on a menu for sole interaction (i.e. the independent viewer of a video conveyed via a data stream) and a channel 8 in the menu is allocated to interact with friends (networked viewers of a video). With regard to this example, the two approaches "independent viewers" and "networked viewers" could be described as follows:

(a) Independent Viewers

Channel 7 offered via the menu allows selecting a VoD movie or a number of a broadcast channel. The data stream conveyed can be modified pursuant to user interaction, i.e. according to choices made by the user. Upon request of the video, a new transmission channel is created for transmitting the movie (if it does not yet exist). In addition, channel numbers not currently being used can also be dynamically created by the middleware for all versions possible for this video of the movie (corresponding to choices that could be made along the storyline of the movie). The middleware may convey information regarding these dynamic channels to the STB (and to other STBs).

Whenever the user makes a choice that changes the story, a new transmission multicast channel can be created. The user's STB sends a join message with the number of the correspondent dynamic multicast channel, the middleware creates and assigns a number to this channel accordingly (or just allows the user to join if the channel already exists in case, e.g., other users are already watching the same version of the movie, e.g., conveyed via broadcast). The join message sent by the STB can be generated automatically so the user does not have to perform any operation. As an option, the STB may virtually maintain said channel 7 in order to inform the user that he still is watching the same movie, whereas the current data stream can be received via a different channel. Thus, the STB can provide some mapping internally (the STB is aware of the dynamic channel associated with the content of the channel 7 according to the recent choice(s) made by the user) and the user is not bothered with current channel numbers resulting from the choices he made.

Hence, dynamic multicast channels can be used (created, maintained, deleted, etc.) to deal with the different versions or a movie conveyed by different data streams. As the approach presented herein also supports social networks, the user may share his personalized video (i.e. the movie with the choices he made) with others (referred to as "friends"). These friends can create their own personalized version based on the user's video. This can be accomplished by sending the number of the dynamic multicast channel currently being watched to the STBs of the friends. Such channels may not appear on a standard IPTV menu in order to avoid maintenance of several thousands of static multicast channels.

If a multicast channel is not being watched, the transmission could be ceased and the resource can be released. Once the video reaches its end, all dynamic multicast channels associated with this video can be released and the resources allocated can be reused (e.g., by clearing an associated table comprising the dynamic channels and the decisions at the STBs).

However, the dynamic assignment can be achieved differently: Instead of the middleware generating numbers for all possible versions of a video and creating a bunch of channels, such creation can be done incrementally. In such scenario, the DSLAM and/or IGMP multicast router may associate the choices with the dynamic multicast channel numbers. As an alternative, the STB may first send a choice to the middleware, the middleware replies with a dynamic multicast channel number and creates such channel, and then the STB joins this channel.

The benefit is to reduce the number of unicast transmissions, which require extensive resources, which may limit the possible interactions provided by the operators via their network capabilities. This can be achieved by said synchronization or by allowing some delay. The approach suggested is in particular applicable for various scenarios, e.g., interactive movies, social networks, 3D television, etc.

Considering the exponential case of data stream transmissions based on potential user choices (e.g., in case all versions of a video are being watched) a large amount of network resources is required for conveying all channels to the users. If, however, not all versions of the movie are being watched, a large amount of resources is not required and can be used otherwise. The solution presented is also highly flexible and even allows unicast transmission, e.g., for video versions that are watched by only a few users, wherein most of the channels watched are conveyed via multicast channels.

User choices can be processed in such a way that videos for all users of the multicast group are synchronized. However, in some cases an additional multicast channel may be created to avoid large delays, but this can still be more efficient than one (unicast) channel for each user.

The approach can be advantageously applied as an efficient broadcast solution for independent users. The solution is compatible with existing hardware and software of routers, STBs and VoD servers.

(b) Networked Viewers

For example, said channel 8 that is visible on the menu allows selecting a VoD movie or a number of a broadcast channel. The data stream conveyed can be modified pursuant to user interaction, i.e. according to choices made by the user or by other users.

Multi-Channel Implementation

This option enables changing the storyline by making choices that result in switching between dynamic multicast channels, which are associated with said channel 8, i.e. with the movie the user is currently watching. Hence, all data streams for this movie are associated with this channel 8 the user is watching. The user is not bothered with any further detail of a physical channel number of the multicast channel. After the movie has ended, the resources of the multicast channels are released and can be used otherwise.

Single-Channel Implementation

Users of a first multicast group may interact (i.e. provide their choices) and receive the same data stream. Users of a second multicast group may receive a different data stream. Hence, for n multicast groups, n multicast channels are provided, each group may watch a different version of the movie according to the respective group's choices. The version the group is watching can be associated with a single logical channel in the IPTV menu (in this example, said channel 8).

Further Advantages

The solution presented opens new possibilities for interactive content. The user may create and watch a personalized storyline represented by a version of a movie that is conveyed via at least one data stream. Watching and interacting with a movie can become a group experience. Different versions of a movie can be watched by one or by several users. Several users may make choices that have an impact on the storyline.

It is an advantage that even a recording function can be individualized, e.g., different versions of the movie can be recorded and watched at a later time.

The approach also supports social networks. Friends can be invited and may follow a personalized version of a movie. Individualized content can be shared also via links that are provided to social web applications.

The following is a list of acronyms and abbreviations appearing in the specification above:

DSL Digital Subscriber Line
DSLAM Digital Subscriber Line Access Multiplexer
ID Invention Disclosure
IGMP Internet Group Management Protocol
IPTV Internet Protocol TV
MIMO Multiple Input Multiple Output
PIM Protocol Independent Multicast
PiP Picture in Picture
PVR Personal Video Recorder
RTP Real-Time Transport Protocol
RTSP Real-Time Streaming Protocol
SAP Session Announcement Protocol
SDP Session Description Protocol (see, e.g., RFC 4566)

STB Set-Top-Box
VoD Video on Demand
xDSL Digital Subscriber Line, Version "x"

The invention claimed is:

1. A method for transporting multimedia information, the method which comprises:
   providing the multimedia information formed of a plurality of data streams, with at least two of the data streams at least partially representing alternative contents of the multimedia information;
   the multimedia information including at least one forking point for selecting one of at least two of the data streams;
   selecting one of the data streams based on a trigger provided by at least one decentralized component, the trigger generated according to a choice and conveyed via a communication network from the at least one decentralized component, the choice made at the at least one decentralized component;
   providing control information for the selected one of the data streams, the control information enabling the at least one decentralized component to access the selected one of the data streams, wherein the data stream transmitted to the at least one decentralized component depends on said choice and is sent to the at least one decentralized component via multicast transmission; and
   joining, into the selected one of the data streams, a further decentralized component, the further decentralized component providing the trigger for the selected one of the data streams within a predetermined amount of time after the one of the data streams has been selected.

2. The method according to claim 1, wherein the selecting step comprises selecting one of the data streams based on a plurality of triggers provided by a plurality of decentralized components.

3. The method according to claim 1, wherein one of the data streams is selected based on properties and/or parameters of decentralized components.

4. The method according to claim 1, wherein the decentralized component informs at least one other decentralized component about the selected data stream.

5. The method according to claim 1, which comprises selecting one of the data streams based on at least one trigger arriving within a predetermined amount of time.

6. The method according to claim 1, wherein the at least two data streams that can be selected at a forking point are identical for a limited duration around or after the forking point.

7. The method according to claim 1, wherein the providing step comprises providing the multimedia information via a network.

8. The method according to claim 1, wherein the multimedia information or at least one data stream of the multimedia information is provided by the decentralized component.

9. The method according to claim 1, wherein the trigger is based on at least one of the following:
   a choice made by a user at the decentralized component, the choice being conveyed by said decentralized component; and
   an automatic choice made by the decentralized component based on an environmental condition and/or a parameter determined by a sensor or via an electronic interface or network.

10. The method according to claim 1, wherein the control information comprises at least one of the following:
    address information that allows access to the data stream selected by the trigger;
    channel information to access the data stream selected by the trigger; and
    time information.

11. The method according to claim 1, which comprises conveying the control information to at least one decentralized component.

12. The method according to claim 1, which comprises recording the plurality of data streams or at least a portion thereof.

13. The method according to claim 1, which comprises generating summary information based on the at least one forking point and the at least one trigger provided.

14. The method according to claim 1, wherein at least some of the data streams comprise different perspectives of the multimedia information.

15. The method according to claim 1, which comprises conveying several data streams at least partially simultaneously to at least one decentralized component.

16. The method according to claim 2, wherein one of the data streams is selected based on a trigger provided for a group of decentralized components or for independent viewers.

17. The method according to claim 5, which comprises selecting the one data stream by default in case no trigger arrives within the predetermined amount of time.

18. The method according to claim 7, wherein the multimedia information is provided from at least one centralized network element.

19. The method according to claim 9, wherein the environmental condition comprises at least one of the following:
    sensor data obtained by the decentralized component;
    information obtained by the decentralized component via the Internet;
    information obtained by the decentralized component from interaction with a user;
    information obtained by the decentralized component from interaction with a group of users;
    weather information;
    a time;
    a temperature; and
    a brightness.

20. The method according to claim 12, wherein the recording is provided by a network recorder or a client recorder.

21. The method according to claim 12, which comprises selecting one of the data streams to be recorded based on a trigger provided by at least one decentralized component.

22. A device for processing multimedia information, the multimedia information being formed of several data streams, with at least two of the data streams at least partially representing alternative contents of the multimedia information, and the multimedia information having at least one forking point for selecting one of at least two of the data streams, the device comprising:
   a processing unit configured for:
   selecting one of the data streams based on a trigger provided by at least one decentralized component, the trigger generated according to a choice and conveyed via a communication network from the at least one decentralized component, the choice made at the at least one decentralized component;
   providing a control information for the one of the data streams thus selected, the control information enabling the at least one decentralized component to access the selected one of the data streams, wherein the data stream transmitted to the at least one decentralized component depends on said choice and is sent to the at least one decentralized component via multicast transmission;

joining, into the selected one of the data streams, a further decentralized component, the further decentralized component providing the trigger for the selected one of the data streams within a predetermined amount of time after the one of the data streams has been selected.

* * * * *